United States Patent [19]

Hasslauer

[11] 4,295,396
[45] Oct. 20, 1981

[54] BAR FEEDING MECHANISM FOR MACHINES FOR WORKING ROTATING BAR STOCK

[75] Inventor: Heinz Hasslauer, Uhingen, Fed. Rep. of Germany

[73] Assignee: Hermann Traub GmbH & Co., Fed. Rep. of Germany

[21] Appl. No.: 142,669

[22] Filed: Apr. 22, 1980

Related U.S. Application Data

[63] Continuation of Ser. No. 933,954, Aug. 15, 1978, abandoned.

[30] Foreign Application Priority Data

Aug. 23, 1977 [DE] Fed. Rep. of Germany ....... 2737957

[51] Int. Cl.³ ............... B23B 3/00; B23B 13/00; B23B 25/00
[52] U.S. Cl. .................... 82/1 C; 82/2.5; 82/38 A

[58] Field of Search ............ 82/1, 1 C, 2.5, 2.7, 82/38 R, 38 A, 39

[56] References Cited

U.S. PATENT DOCUMENTS

| 689,951 | 12/1901 | Clare | 82/38 R |
| 1,961,091 | 5/1934 | Smith et al. | 82/38 R |
| 3,101,015 | 8/1963 | Schuetz | 82/39 |
| 3,535,963 | 10/1970 | Dietl | 82/38 R |

FOREIGN PATENT DOCUMENTS

498220 12/1953 Canada .................... 82/38 R

*Primary Examiner*—Harrison L. Hinson
*Attorney, Agent, or Firm*—Eyre, Mann, Lucas & Just

[57] ABSTRACT

An improvement in bar feeding mechanisms is disclosed. The bar feeding mechanism which comprises a plurality of roller assemblies disposed on a frame has an adjustable stop for limiting the movement of the rollers toward the axis of the bar being fed. The mechanism is especially advantageous for irregularly shaped bars.

7 Claims, 4 Drawing Figures

BAR FEEDING MECHANISM FOR MACHINES FOR WORKING ROTATING BAR STOCK

This is a continuation of application Ser. No. 933,954, filed Aug. 15, 1978 now abandoned.

The invention relates to a bar feeding mechanism for machines, in particular for turning machines, for the working of rotating bar stock which comprises roller assemblies which are disposed on a frame and each of which consists of three or more rollers arranged about an imaginary bar axis common to all roller assemblies, said rollers being adapted to be moved toward the bar axis and away from it by means of an elastic actuating unit.

A bar feeding mechanism of this type, known from German utility model No. 76 21 114, whose rollers are all provided with an elastomer facing, has proved itself in principle as it largely suppresses the generation of noise and transmission of vibration to the following bar-working machine which in most bar feeding mechanisms are extremely troublesome, and does so even when feeding bars of other than circular cross section, for example, of square, rectangular or hexagonal cross section. However, when such special-section bars or bent bars of circular cross section are fed, the life of the rollers is less than satisfactory; especially the facings of the rollers wear rapidly when they are made of an elastomer that is sufficiently soft to assure adequate noise suppression.

The invention thus has as its object to provide, in a bar feeding mechanism of the type described, for a longer life of its rollers even when these have a soft, highly noise-attenuating facing.

In accordance with the invention, this object is accomplished by limiting the motion of the rollers toward the bar axis through an adjustable stop.

This makes it possible to limit the contact of the rollers with the bar. For example, when a rectangular bar is fed, provision can be made for the rollers to roll essentially only on the narrow sides of the bar with appreciable radial pressure and to make no contact with the broad sides, or then only with very light pressure. In this way the edges of the rotating bar are prevented from delivering heavy blows to the rollers. The adjustable limitation of the motion of the rollers toward the imaginary bar axis has the added advantage of permitting the resistance to the feeding of the bar, which can be considerable particularly in the case of rollers having an elastic facing, to be held within limits. Also a bending of thin bars by the rollers can be positively avoided.

Moreover, by properly positioning the stop when a bent bar is fed, provision can be made for the rollers to clear the bar by a limited amount. Such clearance may be confined to the area of a single roller assembly, and its purpose may be to permit the formation of an antinode in the bar, in which flexural vibrations are induced during its rotation. When the bar is satisfactorily guided over other portions by additional roller assemblies, the largely unimpeded formation of an anti-node in the area of one roller assembly or of various roller assemblies may have the advantage that the head end of the bar, which is chucked in a working spindle of an automatic lathe or the like, runs particularly quietly. The tail end of the bar, on which a pusher of conventional design—for example, a pusher driven by a weighted rope—is able to act, can be made to run just as quietly and centered.

To permit differential limitation of the path of the rollers over different portions of the bar while avoiding the expenditure of time required for individual adjustment of the rollers, there is associated with each roller assembly, in a preferred embodiment, a separate stop for all of the rollers belonging to that assembly.

Each stop then has preferably a positioning drive of its own. In place thereof, or preferably in addition thereto, there may be associated with all stops a common positioning drive permitting all rollers to be raised simultaneously from the bar by an adjustable distance. In this way, the resistance of the rollers to the feeding of the bar can be overcome completely, except for the friction due to the weight of the bar resting on the lower rollers, so that but little feeding power is required while at the same time the bar is prevented from dropping out between the rollers.

For the reasons stated above, and since the most pronounced antinode usually forms in the middle of the bar, the preferred procedure of working with the mechanism so designed in accordance with the invention is to position the stops in such a way in the course of the feeding motion of the bar that the rollers of at least one roller assembly allow the bar some radial play over its middle portion and that said rollers are then brought into contact with the bar after its middle portion has moved forward.

An embodiment of the invention is described below with reference to the diagrammatic drawings, where—

Figure 1:
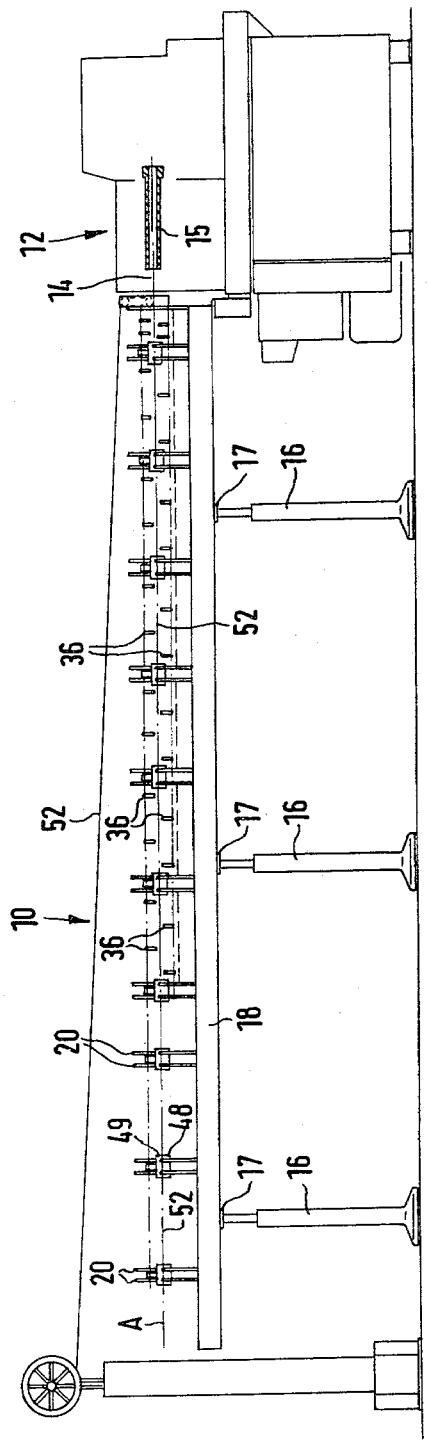
FIG. 1 is a side elevation of a bar feeding mechanism located ahead of an automatic lathe.

The bar feeding mechanism 10, of which FIG. 1 is an overall view, serves to feed to an automatic lathe 12 a bar 14 which in the embodiment shown is of circular cross section. The bar 14 is chucked at what in FIG. 1 is its right end in a hollow rotating spindle 15 of the automatic lathe 12 and is released after every operating cycle of the automatic lathe to execute an advancing motion by one workpiece length. This is done in known manner and therefore will not be described in detail.

The bar feeding mechanism 10 has a plurality of stands 16, each of which is provided with a head plate 17 adapted to be raised or lowered. Mounted on the head plates 17 is a pair of horizontal rails 18. The rails 18 extend parallel to the rotating spindle 15 and hence parallel to the bar 14. Mounted on the rails 18 are a plurality of girders 20, each of which extends in a vertical plane at right angles to the bar 14. The girders 20 are arranged in pairs in such a way that they alternately enclose small and large spaces.

According to FIGS. 2, 3 and 4, two shafts, hereinafter referred to as the lower shaft 22 and the upper shaft 24, extend through the girders parallel to the bar 14. Disposed in every large space is, moreover, a shaft 26 which likewise extends parallel to the bar 14 and is rotatably supported in the two girders 20 which bound the respective large space. The shafts 26 in the individual large spaces are not interconnected in the embodiment shown and therefore can be rotated independently of one another. In every large space two lower levers 28 and 30 are mounted on the lower shaft 22, and two upper levers 32 and 34 on the upper shaft 24. On each of the levers 28 to 34 there is journaled a roller 36 provided with an elastomer facing.

Figure 4:
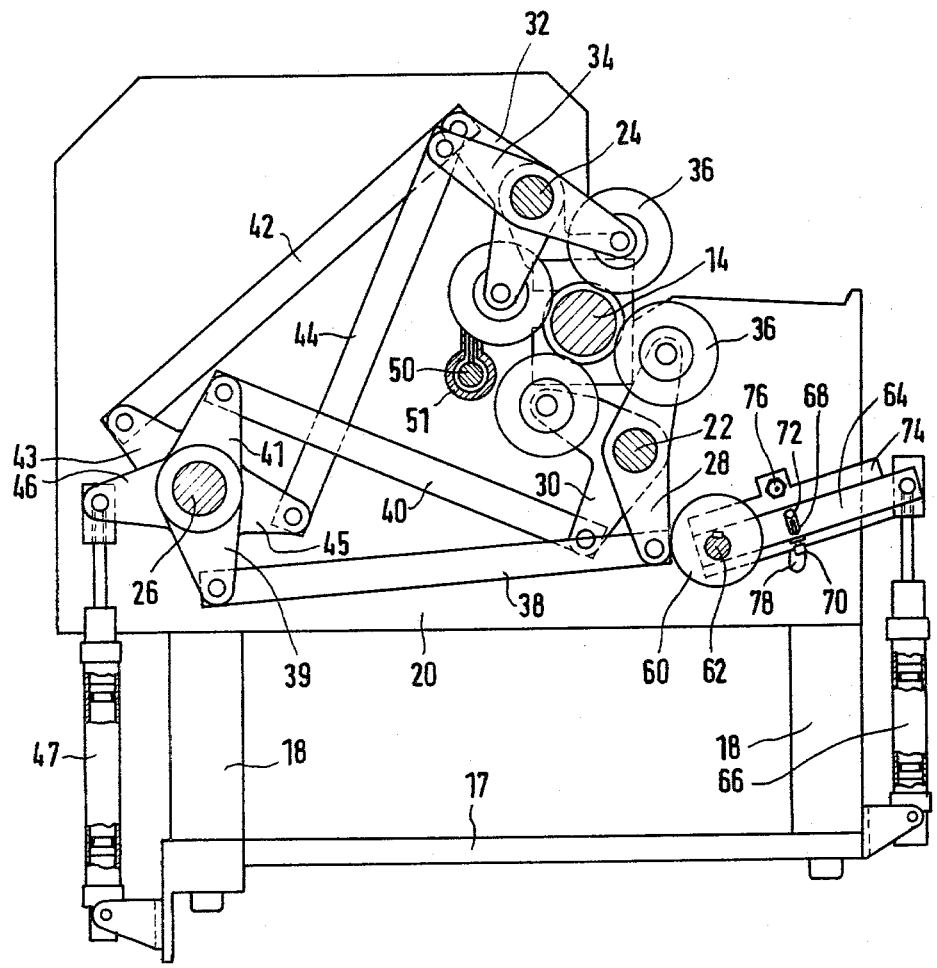
FIG. 4 is a sectional view taken along the line IV—IV in FIG. 2.

According to FIG. 4, the levers 28, 30, 32 and 34 are constructed in such a way that the rollers 36 are disposed at equal angular distances of 90° around an imaginary bar axis A with which the geometric longitudinal axis of the bar 14 is to coincide. This arrangement with four rollers 36 is suited particularly for bars having the circular cross section shown in FIG. 4; for bars of triangular or hexagonal cross section, three rollers offset by 120° relative to one another may be provided. In this case, the lower levers 28 and 30 are preferably arranged so that the shafts of the rollers 36 which they carry are at the same height; and of the two upper levers 32 and 34, one is left out along with its associated roller 36 and the other is disposed so that the shaft of the roller 36 mounted on it lies in the vertical center plane between the shafts of the two lower rollers.

Figure 2:
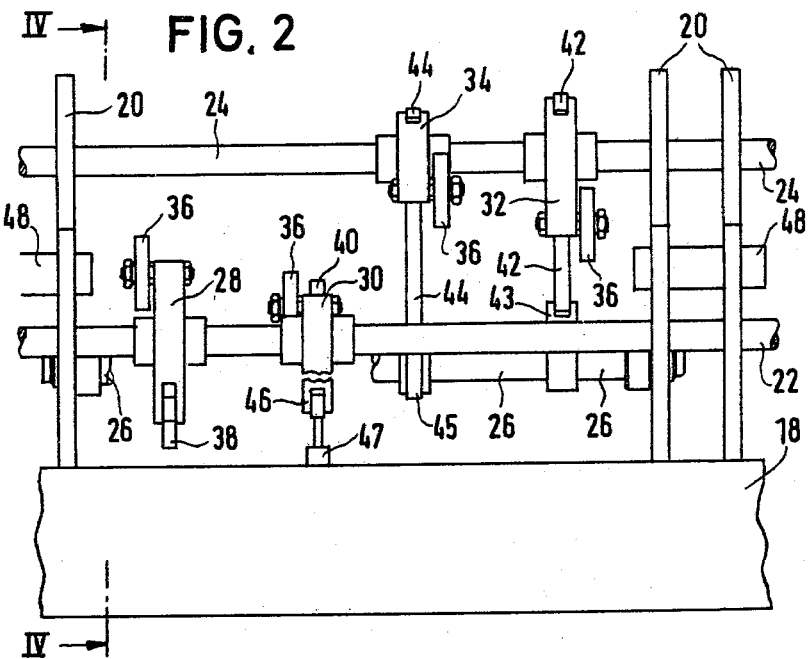
FIG. 2 shows a portion of FIG. 1 on an enlarged scale.
Figure 3:
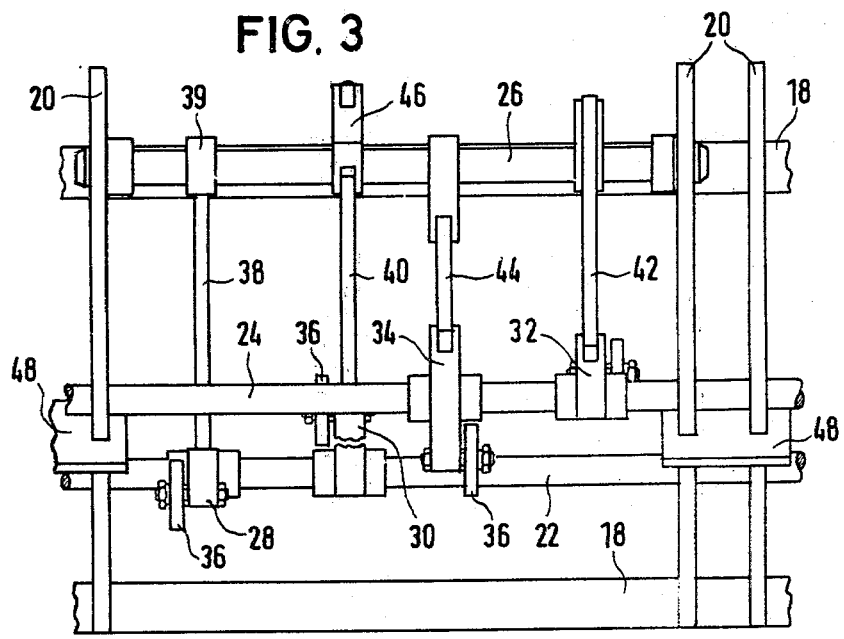
FIG. 3 is a plan view to FIG. 2.

According to FIGS. 2, 3 and 4, each of the levers 28, 30, 32 and 34 is linked through a guide rod 38 or 40 or 42 or 44, respectively, to an arm 39 or 41 or 43 or 45, respectively, which is secured to the respective shaft 26. A fifth arm 46 fastened to the shaft 26 is articulated to an actuating unit 47. In the embodiment shown, the actuating unit 47 is a hydraulic or pneumatic piston-cylinder unit whose cylinder is articulated to the rail 18 which in FIG. 4 is on the left.

FIG. 4 shows the actuating unit 47 and the components actuated by it in an operating position in which the rollers 36 hold a bar 14 in a centered position. When the piston rod of the actuating unit 47 is extended, the rollers 36 are moved away from the bar axis A, thus making room for the insertion of a new bar 14 or the removal of an as yet unconsumed bar.

For the feeding of the bar 14, a pusher 50 is provided which is guided in known manner in a tube 51 having a longitudinal slot, and which is adapted to be driven by a weighted rope.

Associated with the lever 28 is a stop 60 which limits the range of rotation of said lever 28 in one of the directions of rotation in which the associated roller 36 approaches the imaginary bar axis A. Since all levers 28, 30, 32 and 34 are interconnected through the shaft 26, the stop 60 limits the range of rotation of all levers of the assembly consisting in the embodiment shown of four rollers 36 with which the stop is associated. In the embodiment shown, the stop 60 has the form of a circular disk mounted eccentrically on a shaft 62. The shaft 62 extends between at least two girders 20 and is rotatably supported therein; and, like the shaft 26, it may be sectioned but may also extend in one piece along the entire bar feeding mechanism and carry on individual stop 60 for every roller assembly. Secured to the shaft 62 or to each of its sections is a positioning lever 64 which is articulated to a positioning drive 66.

In the embodiment shown, the positioning drive 66 is a pneumatic piston-cylinder unit whose cylinder is pivoted on one of the rails 18. The positioning lever 64 has a transverse slot 68 whose effective length is limited by a stop screw 70 which is likewise transversely set into the positioning lever 64. A pin 72 which is secured to a limit lever 74 and is parallel to the shaft 62 projects into the slot 68. The limit lever 74 is rotatably mounted on the shaft 62 and is adapted to be secured to the adjacent girder 20 by means of a setscrew 76 which engages an arcuate slot 78 in said girder.

The position of the stop screw 70 determines the size of the angular range within which the positioning lever 64, and with it the stop 60, can be positioned by the positioning drive 66. On the other hand, the position of the limit lever 74 determines the location of said angular range, and hence the location of what in relation to the imaginary bar axis A is the inner extreme position of the rollers 36.

According to FIG. 4, the lever 28 bears on the stop 60 and the latter is positioned so that the rollers 36 are spaced a small distance from the bar 14 and hold it centered while allowing it a limited freedom of movement so that it can easily be advanced.

I claim:

1. A method of guiding a rotating bar stock in a machine for working said bar stock, said bar stock having a middle portion and a tail portion, comprising the steps of:
  (a) contacting said rotating bar stock with pressure engagement by rollers in a plurality of roller assemblies, said roller assemblies being adapted to support and center said bar stock for feeding to said machine;
  (b) feeding said rotating bar stock for working by said machine;
  (c) limiting the contact of said rollers of at least one roller assembly engaging said middle portion of said rotating bar stock to allow sufficient play for a radial antinode of rotation; and
  (d) readjusting the contact of said rollers of at least one roller assembly after the middle portion has passed to allow pressure engagement of said tail portion of said rotating bar stock.

2. In a bar feeding mechanism for a machine for the working of rotating bar stock, said bar feeding mechanism comprising roller assemblies disposed on a frame and each said assembly comprising at least three rollers arranged about an imaginary bar axis common to all roller assemblies and said rollers being adapted to be moved toward the bar axis and away therefrom by means of an elastic actuating unit, the improvement comprising an adjustable mechanical stop preventing said elastic actuating unit from moving the rollers toward the said bar axis beyond a predetermined limit.

3. The mechanism of claim 2 wherein there is a separate stop associated with each said roller assembly, each said stop being effective to limit all of the rollers of the roller assembly with which it is associated.

4. The mechanism of claim 3 wherein there is a separate positioning drive operatively connected to each said stop.

5. The mechanism of claim 4 wherein each said separate positioning drive is selectively operable.

6. The mechanism of claim 2 wherein each roller is provided with an elastomer facing.

7. The mechanism of claim 2 or 6 wherein the individual rollers of each roller assembly are spaced from each other in an axial direction.

* * * * *